Figure 8:
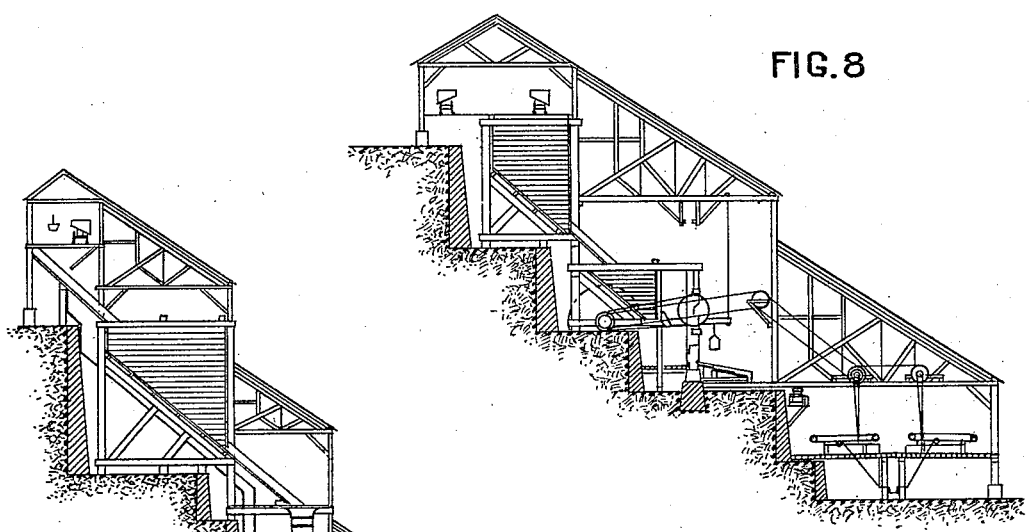

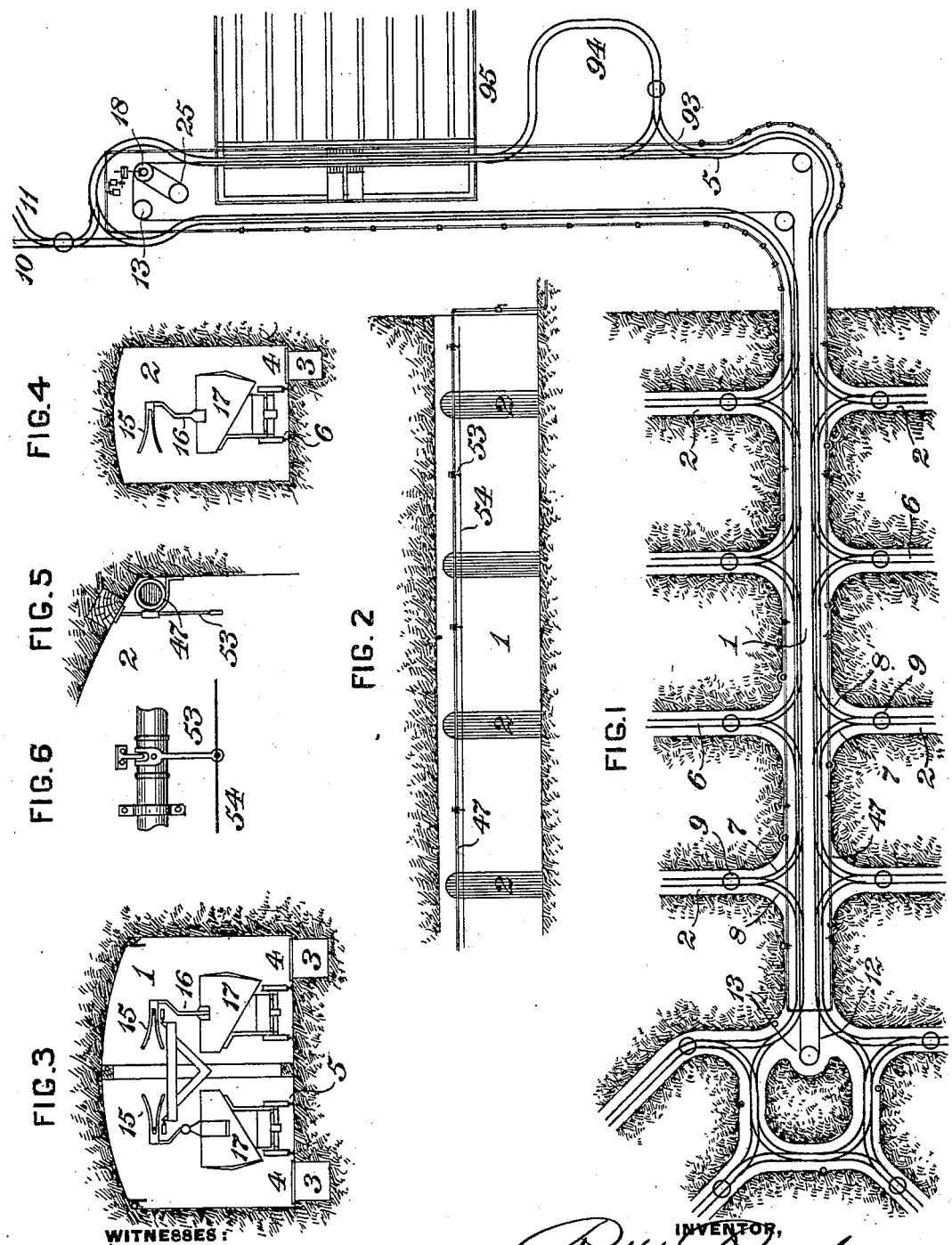

No. 690,225. Patented Dec. 31, 1901.
R. BAGGALEY.
AUTOMATIC HAULAGE AND DELIVERY SYSTEM.
(Application filed Aug. 16, 1901.)
(No Model.) 10 Sheets—Sheet 2.

WITNESSES:
James C. Herron.
S. R. Bell.

INVENTOR,
Ralph Baggaley
by J. Snowden Bell,
Att'y.

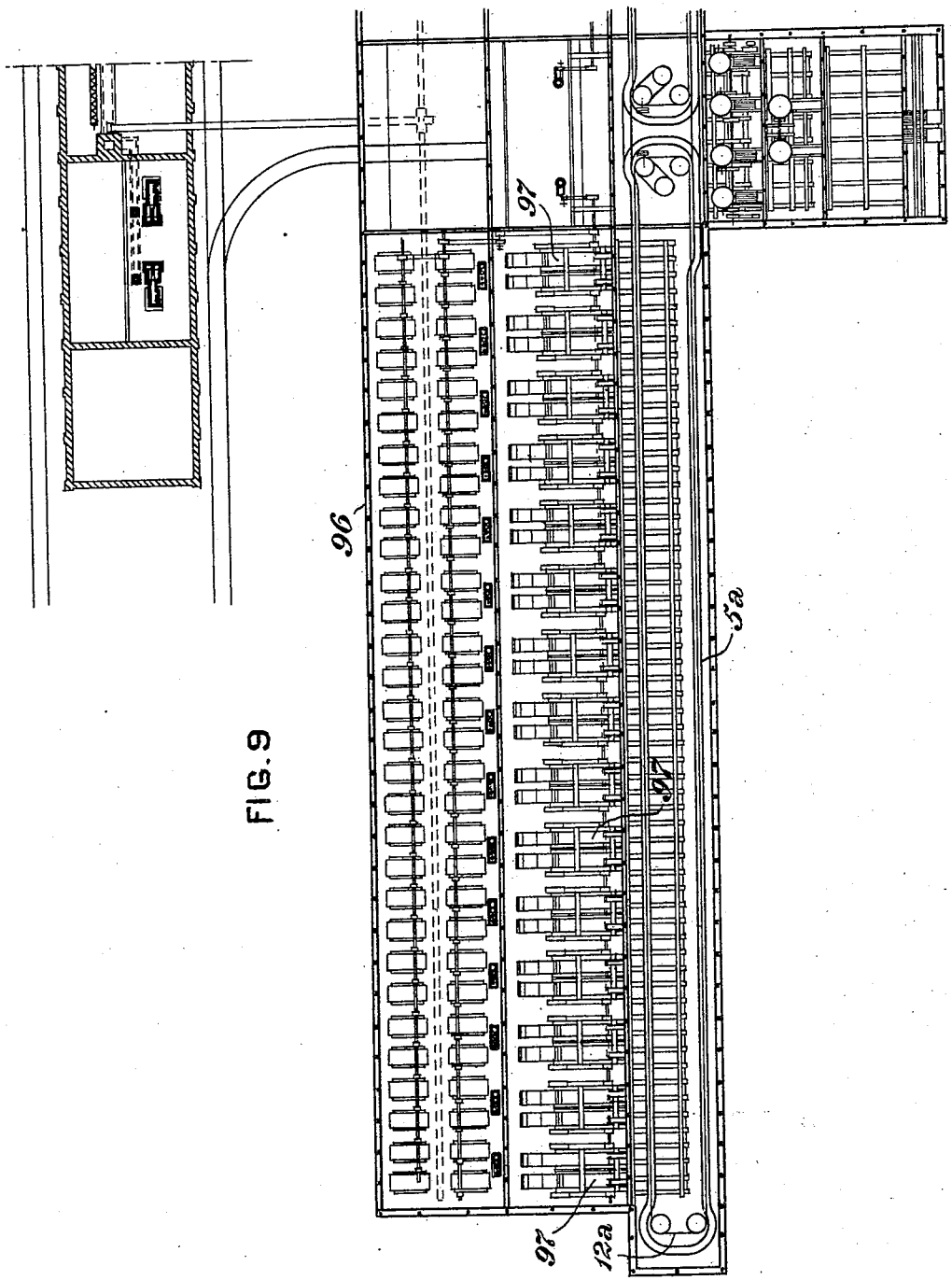

No. 690,225. Patented Dec. 31, 1901.
R. BAGGALEY.
AUTOMATIC HAULAGE AND DELIVERY SYSTEM.
(Application filed Aug. 16, 1901.)
(No Model.) 10 Sheets—Sheet 4.
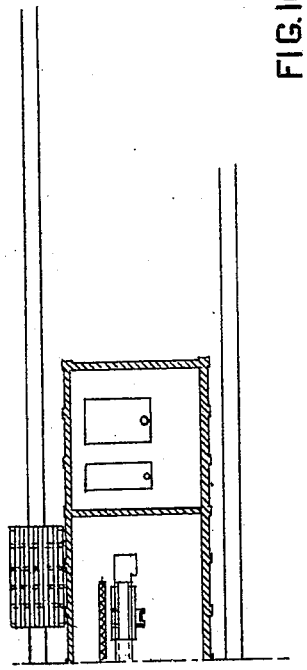
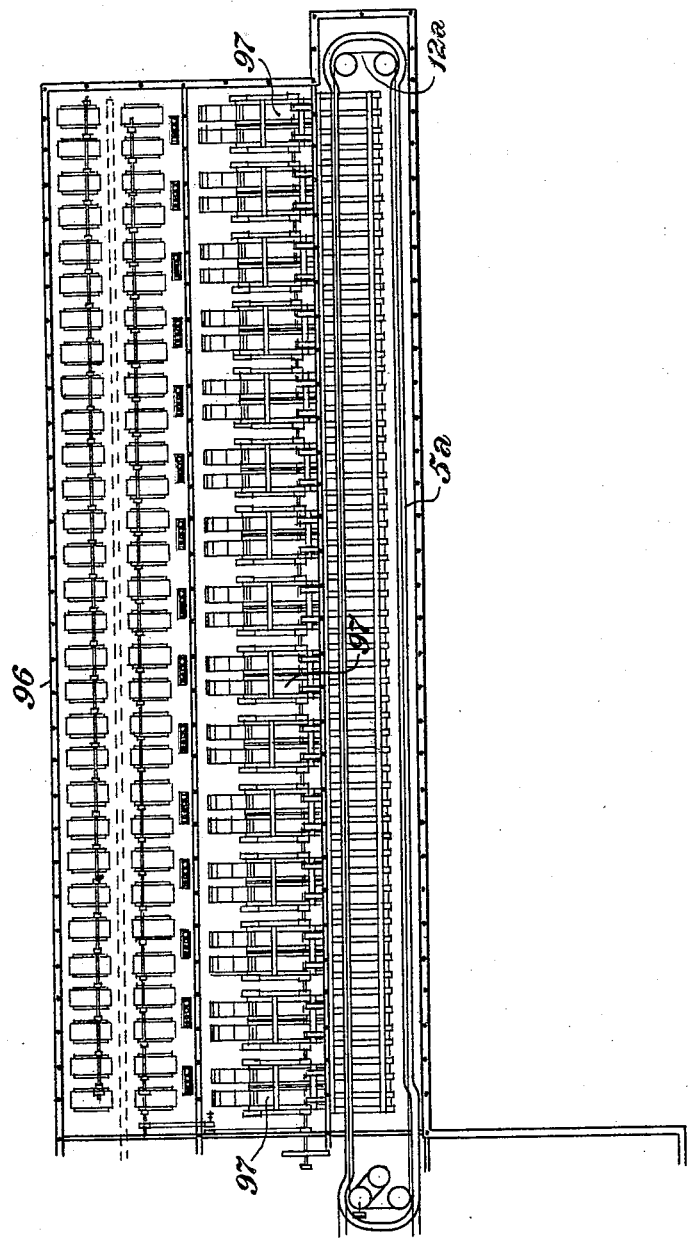
FIG. 10

No. 690,225. Patented Dec. 31, 1901.
R. BAGGALEY.
AUTOMATIC HAULAGE AND DELIVERY SYSTEM.
(Application filed Aug. 16, 1901.)
(No Model.) 10 Sheets—Sheet 5.
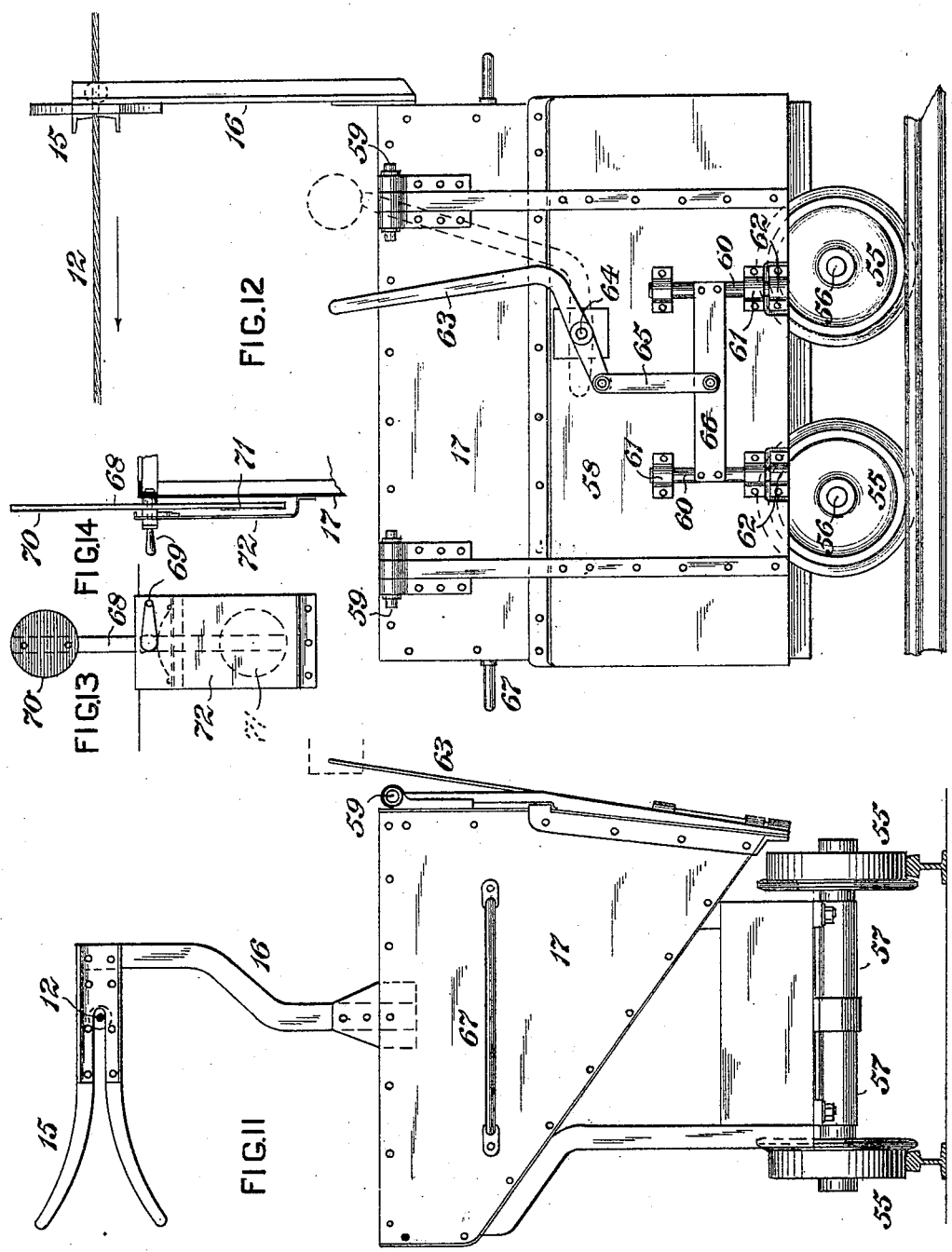
WITNESSES: INVENTOR,

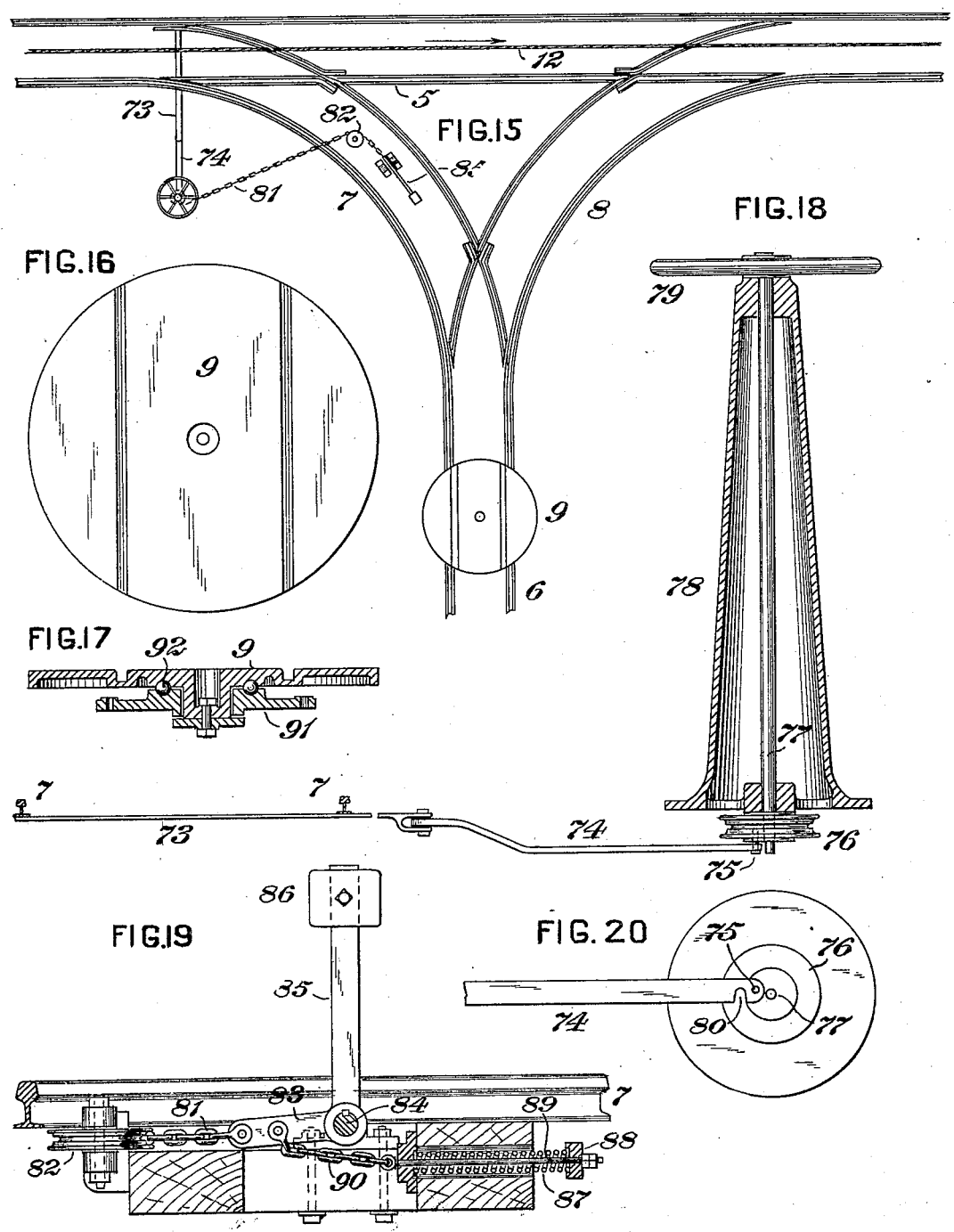

No. 690,225. Patented Dec. 31, 1901.
R. BAGGALEY.
AUTOMATIC HAULAGE AND DELIVERY SYSTEM.
(Application filed Aug. 16, 1901.)
(No Model.) 10 Sheets—Sheet 7.
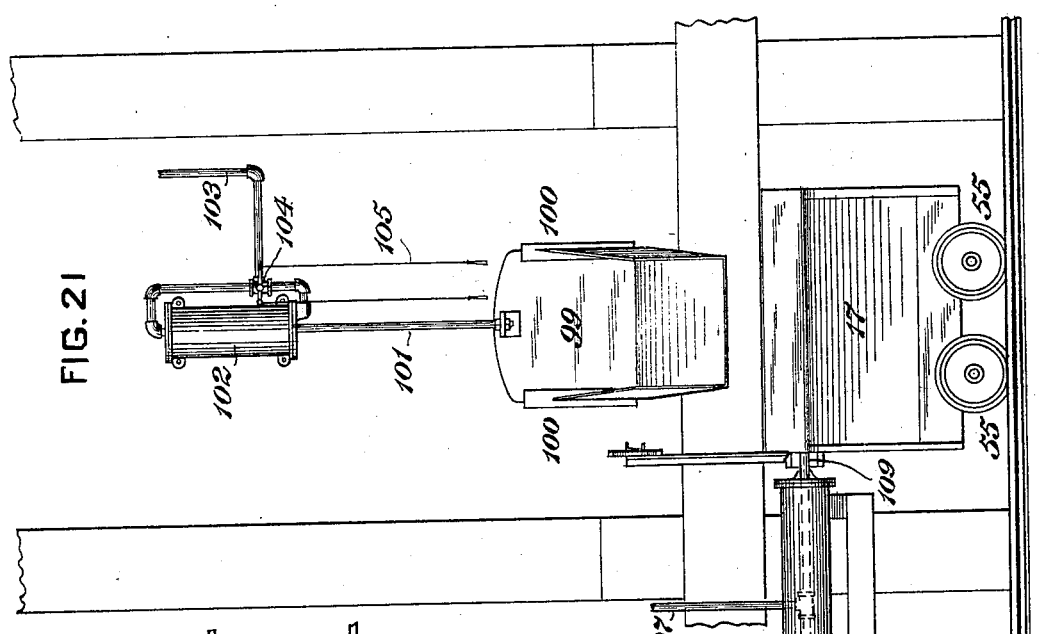
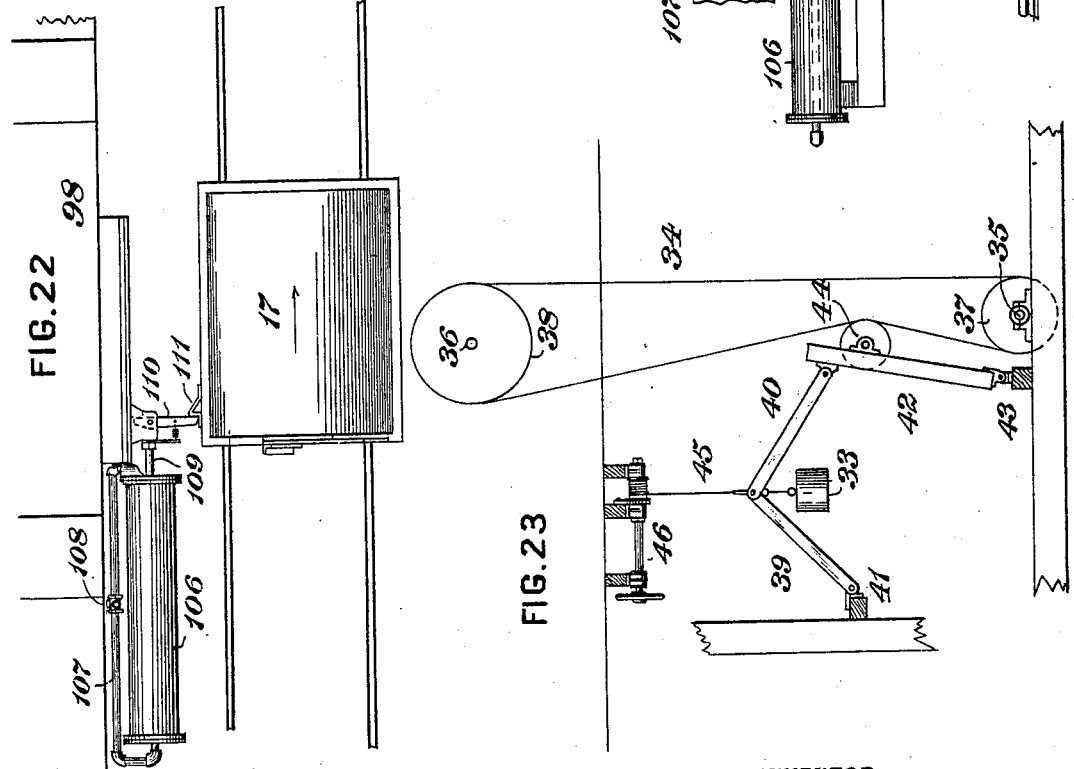
WITNESSES: James C. Herron. S. R. Bell.
INVENTOR Ralph Baggaley by Howden Bell, Att'y.

No. 690,225.  
R. BAGGALEY.  
AUTOMATIC HAULAGE AND DELIVERY SYSTEM.  
(Application filed Aug. 16, 1901.)  
Patented Dec. 31, 1901.
(No Model.)  
10 Sheets—Sheet 8.
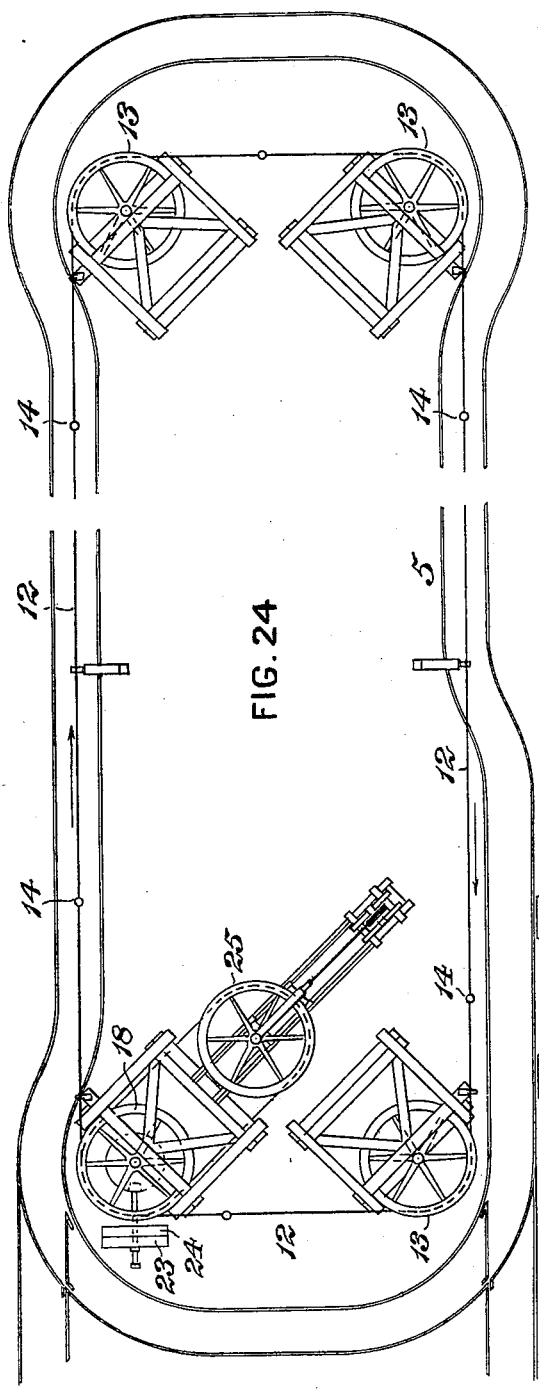
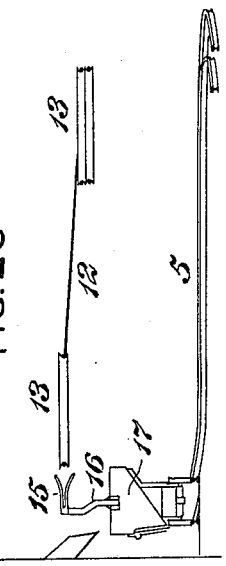
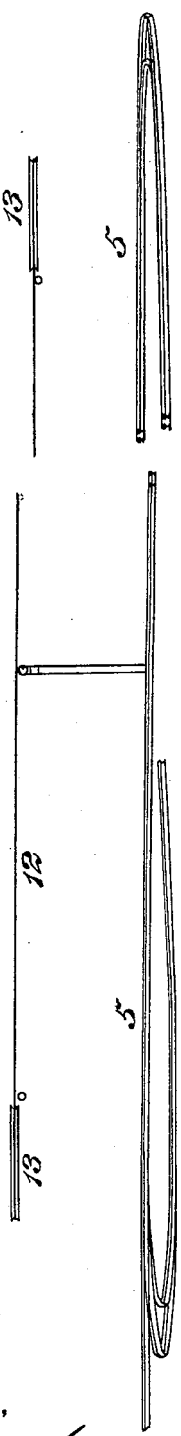
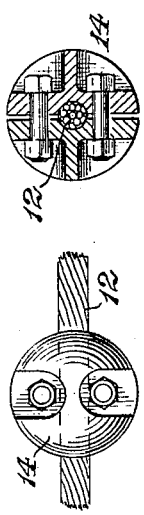
WITNESSES:  
James C. Herron  
S. R. Bell
INVENTOR,  
Ralph Baggaley  
by Thurlow Bell, Att'y.

No. 690,225. Patented Dec. 31, 1901.
R. BAGGALEY.
AUTOMATIC HAULAGE AND DELIVERY SYSTEM.
(Application filed Aug. 16, 1901.)
(No Model.) 10 Sheets—Sheet 9.
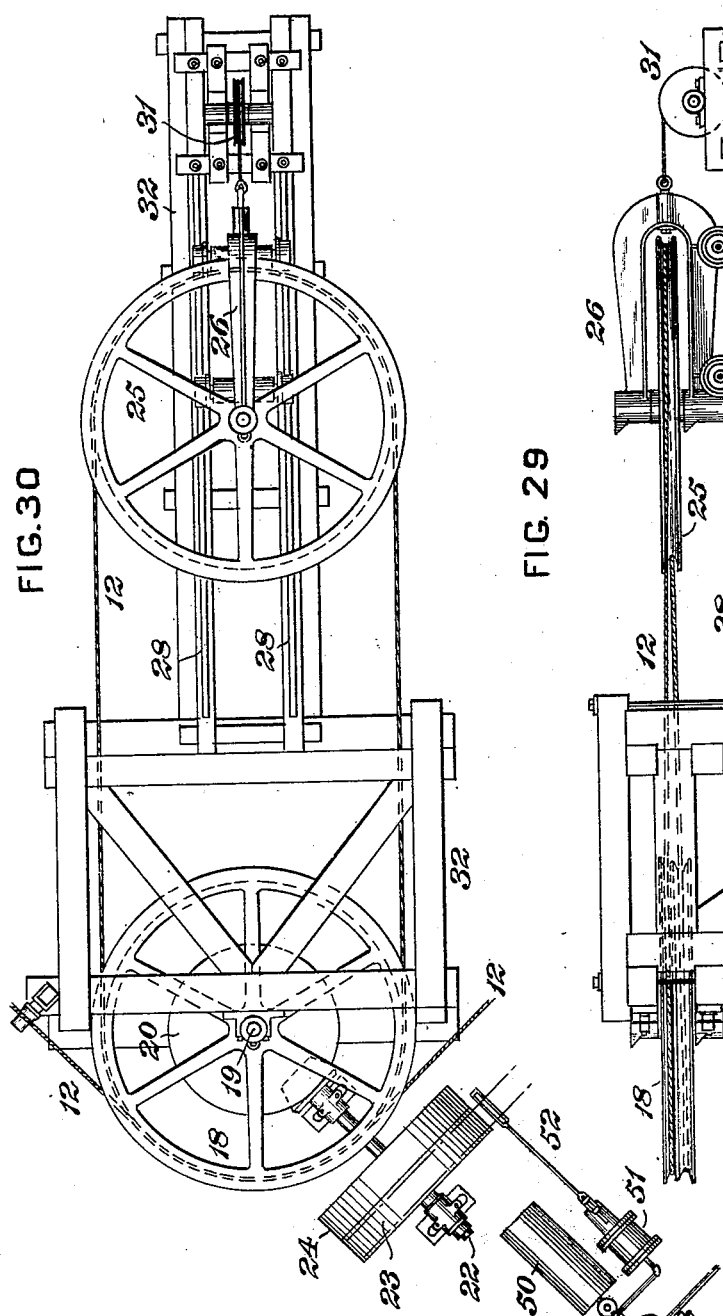
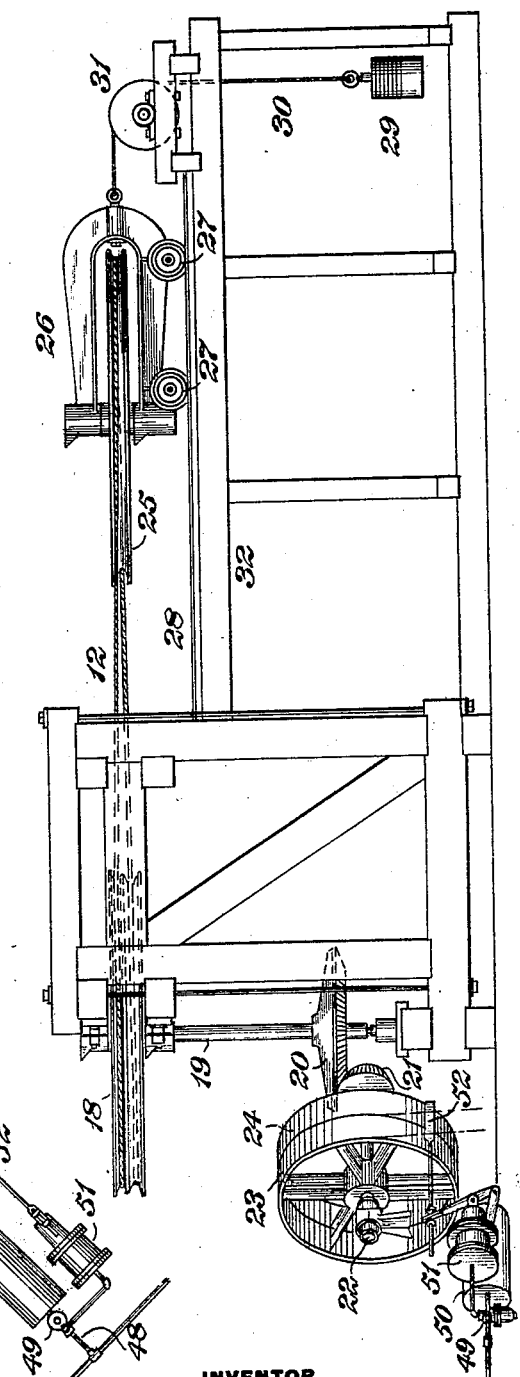
WITNESSES: INVENTOR, No. 690,225. Patented Dec. 31, 1901.
R. BAGGALEY.
AUTOMATIC HAULAGE AND DELIVERY SYSTEM.
(Application filed Aug. 16, 1901.)
(No Model.) 10 Sheets—Sheet 10.
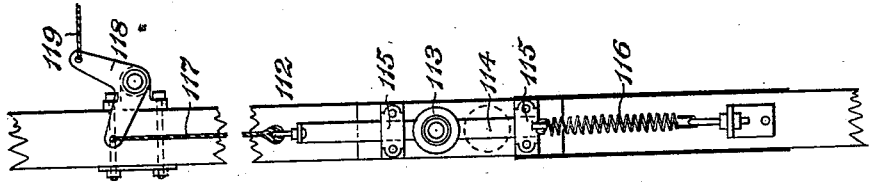
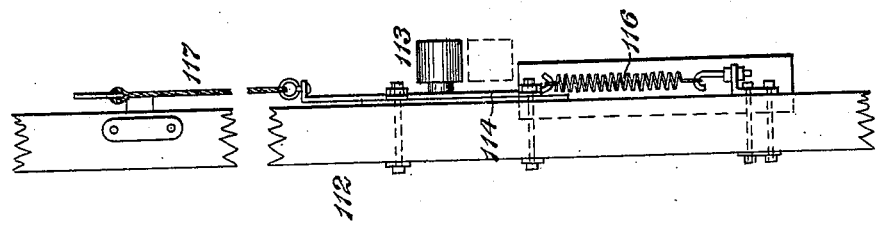
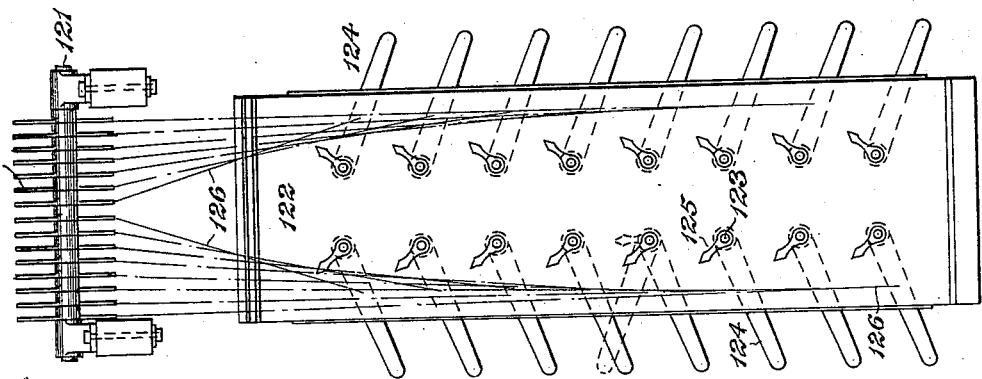
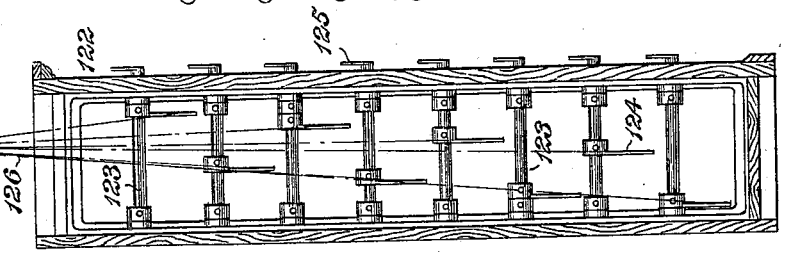
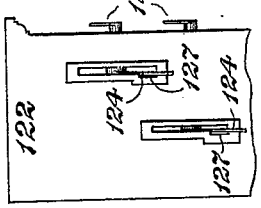
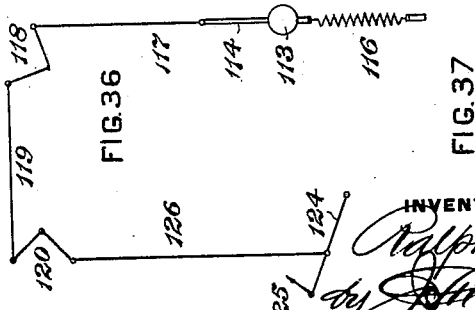
WITNESSES: INVENTOR,

UNITED STATES PATENT OFFICE.

RALPH BAGGALEY, OF PITTSBURG, PENNSYLVANIA.

AUTOMATIC HAULAGE AND DELIVERY SYSTEM.

SPECIFICATION forming part of Letters Patent No. 690,225, dated December 31, 1901.

Application filed August 16, 1901. Serial No. 72,276. (No model.)

*To all whom it may concern:*

Be it known that I, RALPH BAGGALEY, of Pittsburg, in the county of Allegheny and State of Pennsylvania, have invented a certain new and useful Improvement in Automatic Haulage and Delivery Systems, of which improvement the following is a specification.

The object of my invention is to provide means for expeditiously and economically transporting ore, minerals, or rock from the interior of tunnels, drifts, adits, or other excavations or cuttings to a desired exterior point or points or for conveying material into such excavations and from point to point in a milling system connected therewith, and for automatically delivering the outwardly-transported material to and conveying it from desired and selected receptacles or locations of discharge, said means being characterized by the features of comparatively low cost of installation and operation, small expenditure of operating power, and the elimination to so substantial an extent as to closely approximate a total one of the very great expense of manual labor which has heretofore been required in operations of the character of those for which my invention is designed.

The improvement claimed is hereinafter fully set forth.

Figure 7:
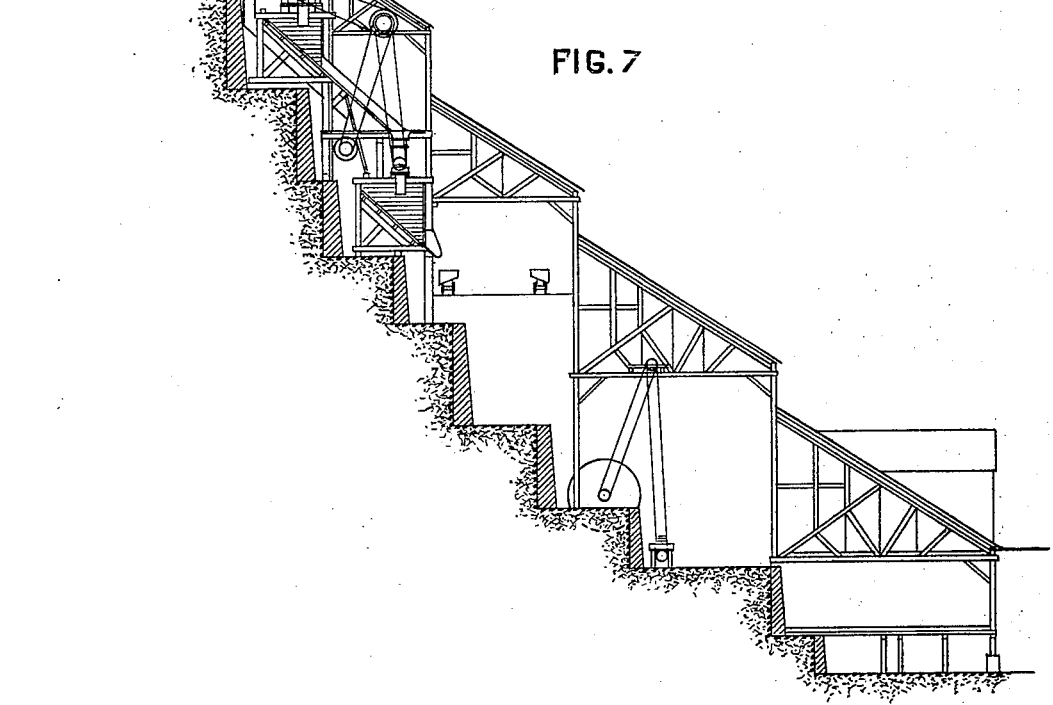

In the accompanying drawings, Figure 1 is a horizontal section through the main tunnel and drifts of a mine, illustrating an application of my invention; Fig. 2, a vertical longitudinal section through the major portion of the main tunnel; Fig. 3, a vertical transverse section, on an enlarged scale, through the same; Fig. 4, a similar section through a drift; Fig. 5, a similar section, on a further enlarged scale, at one of the upper angles of the main tunnel, showing the pipe-line of the pneumatic stopping mechanism; Fig. 6, a side view of a portion of the pipe-line, showing the operating-arms of an air-release valve; Figs. 7 and 8, transverse sections through buildings located at different levels on the slope of a mountain and containing storage-bins and milling apparatus for the reception and treatment of material transported from the interior of a mine by the employment of my invention; Fig. 9, a diagrammatic plan view of the central and left-hand portions of a stamp-mill in connection with which my invention is applied; Fig. 10, a similar view of the right-hand portion of the same; Fig. 11, an end view in elevation of a car embodying one of the features of my invention; Fig. 12, a side view in elevation of the same; Fig. 13, a front or face view of a load-indicating signal for a car; Fig. 14, a vertical section through the same and through a portion of the car-body to which it is attached; Fig. 15, a plan view of a portion of the railroad-track of a drift with its switches and turn-table; Fig. 16, a similar view, on an enlarged scale, of a turn-table; Fig. 17, a transverse section through the same; Fig. 18, a view, partly in elevation and partly in section, of a switch-operating mechanism; Fig. 19, a view, partly in elevation and partly in section, of a switch-locking mechanism; Fig. 20, a bottom plan view of a portion of the mechanism shown in Fig. 18; Fig. 21, a front view in elevation of a storage-bin, showing pneumatic apparatus for operating the discharge-gate and for starting a car; Fig. 22, a plan view of a pneumatic car-starting apparatus; Fig. 23, a view in elevation of a mechanism for regulating the tension of a cable-driving belt; Fig. 24, a plan view of a railroad-track, overhead propelling-cable, and the driving and tension-adjusting mechanism of the cable; Fig. 25, a side view in elevation of the track and cable; Fig. 26, an end view of the same; Fig. 27, a view in elevation of a pushing-ball connected to a transporting-cable; Fig. 28, a transverse section through the same; Fig. 29, a side view, in elevation and on an enlarged scale, of a cable-driving and tension-adjusting mechanism; Fig. 30, a plan or top view of the same; Fig. 31, a side view in elevation of an adjusting apparatus for a plurality of car-door-opening mechanisms; Fig. 32, a front view of the same; Fig. 33, a side view in elevation of a car-door-opening mechanism; Fig. 34, a front view of the same; Fig. 35, a side view in elevation of the upper portion of the frame of the adjusting apparatus of Figs. 31 and 32, showing means for retaining the operating-arms in lowered position; Fig. 36, a diagrammatic view illustrating the connections of an operating-arm and a car-door-opening mechanism, and Fig. 37 a side view in elevation of an operating-arm.

My invention is herein illustrated as applied in connection with an ore mining and treating plant, comprising a main tunnel driven to any desired length through or in proximity to veins or deposits of ore and having lateral branches or drifts, out of which ore and rock are mined, and the stamp-mills and other buildings and machinery ordinarily employed in the mining and treatment of ore or other minerals.

The main tunnel 1 communicates with lateral drifts 2, driven at proper intervals, and its grade, as well as the grades of the drifts, descends slightly outwardly in order to afford natural drainage for water which flows to the exterior through side drains 3, which are covered by footways 4. A substantial double-track railroad 5 is laid in the main tunnel and extends outside thereof to any desired length, and the inner and outer ends of the tracks are connected by loops, so that cars may make a continuous circuit throughout the entire length of the track without being turned. Branch tracks 6 are laid in the several drifts 2, each being connected with one of the main tracks 5 by a receiving-switch 7 and a delivery-switch 8 and being provided with a turn-table 9, so that a car may be run into a drift-track, turned, loaded, and run out, as hereinafter fully described. Branch tracks 10 11 extend from the outer terminal of the main track to different desired points.

The transportation of cars over the main track is effected by means of an overhead endless wire rope or cable 12, which is carried over supporting-rollers in the ordinary manner and its direction of movement changed in passing around curves by guide-sheaves 13. The movement of the cable is transmitted to the cars by means of pushing-balls 14, Figs. 27 and 28, which are secured at proper intervals to the cable and which abut against jaws 15, fixed to vertical standards 16 on the bodies 17 of the cars. The jaws 15 are open at their outer ends and the cable passes freely through them, so that a car may be released from and brought into operative engagement with the cable for passing around curves or for transfer to and from a branch track whenever required. In order to enable cars to pass around a curve, the track is slightly elevated in advance of the curve and turned outwardly from the line of the cable and downwardly at and around the major portion of the curve. Upon entering the curve the cars will consequently be propelled by gravity at a speed greater than that of the cable, and the jaws on the cars will be carried away from the pushing-balls on the cable by which they were propelled on the preceding straight portion. When each car has passed the curve and entered the succeeding straight portion of the track, its jaws 15 again pass into position above and below the cable, and it is propelled by the pushing-ball thereon which first abuts against the jaws when in this position. The relation of the track, car, and propelling-cable in the passage of a car around a curve will be seen by reference to Figs. 24 to 26, inclusive.

The construction and manner of operation of the cable-driving and tension-adjusting mechanism are shown in Figs. 23, 24, 29, and 30. Adjacent to one of the terminals of each main double-track railroad 5, whether this track be that leading into the tunnel 1 or be a similar track extending through or adjacent to a stamp-mill or other building or buildings constituting part of the ore-treating plant, as is provided in the practice of my invention, the endless propelling-cable 12 is passed around peripheral grooves in a sheave or grooved driving-pulley 18, fixed upon a vertical driving-shaft 19, to which rotation is imparted by any suitable prime mover. In the instance shown the driving-shaft 19 carries a bevel-gear 20, which meshes with a corresponding pinion 21, fixed upon a counter-shaft 22, upon which is secured a fast pulley 23, and which carries a loose pulley 24 adjacent to the fast pulley. The counter-shaft 22 is rotated by a belt passing over the fast pulley 23 and over a pulley on a shaft, (not shown,) which is rotated by a prime mover in any known and preferred manner. After passing around the driving-pulley 18 the cable 12 is led over a sheave or grooved pulley 25, which forms part of a tension-adjusting mechanism, and is journaled in bearings in a carriage 26, supported on wheels 27 and adapted to traverse on horizontal track-rails 28 toward and from the driving-shaft 19. A weight 29, the degree of draft of which may be adjusted by removable sections, is coupled to the carriage 26 by a rope or other flexible connection 30, passing over a sheave 31, journaled in bearings in the frame 32 of the driving and adjusting mechanism. The weight 29 imposes a constant tension upon the propelling-cable 12, which tension may be regulated, as desired, by adjustment of the weight, so as to automatically take up any slack in the cable and admit of sufficient elasticity therein to enable the pushing-balls 14 thereof to pass easily over the supporting-rollers. The cable is led from the sheave 25 of the tension-adjusting mechanism back to the driving-pulley 18 and thence to the opposite terminal of the double track, being passed over guide-sheaves 13 at curved portions of the line.

In order to reduce as far as practicable the liability to accident in transporting cars over the main track and in the event of an accident—as, for example, the derailing of a car, the careless running of a car out of a drift-track against a passing car on the main track, or a tangle in or derangement of the propelling-cable—means are provided whereby the movement of the cable may be instantly arrested either automatically by means of a belt-tension regulator or manually by a pneumatic belt-shifting mechanism.

A belt-tension regulator operative to the end above indicated is shown in Fig. 23, the same consisting of an adjustable toggle-lever system through which the action of a weight 33 is exerted upon a driving-belt 34, by which power is transmitted from one shaft 35 to another shaft 36 of the cable-driving mechanism, the belt 34 passing over pulleys 37 and 38 on the respective shafts. One of said shafts—as, say, the shaft 35—is driven either directly or indirectly, as the case may be, by the prime mover, and the other shaft 36 imparts rotation either directly or indirectly to the counter-shaft 22, through which, as before described, the driving-shaft 19 and driving-pulley 18 of the propelling-cable 12 are rotated. The weight 33, by which tension is imposed upon the driving-belt 34, is suspended from the coupled ends of two toggle-levers 39 and 40, one of which, 39, is pivoted to a fixed support 41, and the other, 40, is coupled to one end of a pressure-lever 42, the opposite end of which is pivoted to a fixed support 43 and which carries a pressure-roller 44, bearing on the adjacent outer side of the driving-belt 34. The coupled toggle-levers 39 40 are connected by a rope or chain 45 with an adjusting-shaft 46, by the rotation of which the coupled ends of the toggle-levers and the connected weight 33 may be raised or lowered, as desired, and the pressure-roller 44 be consequently caused to bear with correspondingly less or greater force upon the driving-belt 34.

By the above construction the tension of the driving-belt 34 can be readily and accurately adjusted to the degree proper to effect the traverse of the propelling-cable 12 in regular service without undue friction. Upon the imposition of excessive or abnormal strain upon the cable resultant upon an accident, as above indicated, the driving-belt 34 will slip upon its pulleys, and the movement of the cable will consequently be arrested.

As a further measure of protection against damage by accidental interruption of the normal operation of the cable and the cars which it moves, a manually-operated fluid-pressure mechanism, preferably, as shown, a pneumatic one, is provided, the construction of which is shown in Figs. 1, 2, 5, 6, 29, and 30.

A main air-pipe 47, which communicates at any convenient point with an air reservoir, compressor, or other suitable known source of air under pressure, (not shown,) extends throughout the line of the main railroad-track 5, being supported above the same in such position as to be conveniently accessible without interference with the movements of the cars on the track and is connected by a branch pipe 48 with a triple valve 49, which controls communication between the main air-pipe 47 and an auxiliary air-reservoir 50, between said reservoir and a belt-shifter cylinder 51, and between the cylinder 51 and the atmosphere. The main air-pipe, triple valve, belt-shifter cylinder, and their intermediate connections accord in all substantial particulars with the corresponding members of the well-known standard Westinghouse automatic air-brake apparatus, which is here applied for the purpose of shifting a belt from a fast pulley to and from a loose pulley instead of applying and releasing brake-shoes. The detailed construction of the members above stated does not form part of my present invention and being familiar to those skilled in railroad transportation need not be herein fully and at length described.

The belt-shifter cylinder 51 is provided with a piston, piston-rod, and releasing-spring similar to those of a standard brake-cylinder, and the piston-rod is connected to a belt-shifter 52, by which lateral movement is imparted to the driving-belt which passes over the fast pulley 23 of the counter-shaft 22, through which movement is imparted, as before described, to the propelling-cable 12. In the normal operation of the cable (similarly to the "running" condition of an automatic air-brake apparatus) the piston of the cylinder 51 is brought by the releasing-spring into such position as to hold the driving-belt on the fast pulley 23, and upon the release of pressure from the main air-pipe 47 the piston is moved outwardly by the pressure in the auxiliary reservoir 50, which is admitted by the triple valve 49, and the driving-belt is shifted to the loose pulley 24, thereby immediately arresting the movement of the propelling-cable 12. Upon the reinstatement of normal pressure in the main air-pipe the piston is returned to normal position by the releasing-spring, and the belt is shifted to the fast pulley 23, so as to again impart movement to the propelling-cable.

In order to enable the stoppage of the cable to be effected at any desired point in the line of the track, the main air-pipe 47 is provided at suitable intervals with atmospheric release-valves of any suitable and preferred construction, each of which is actuated by an operating-arm 53, the operating-arms of the series being connected by a cord or chain 54, so as to be accessible at any desired point. By opening one of the release-valves, which can be done by a pull on the cord 54, air is released from the main air-pipe and the belt is shifted, as above described, to the loose pulley and the cable stopped. The release-valves are fitted with suitable closing-springs, each of which is preferably held out of operation when its release-valve is opened and until it is desired that it shall be closed to admit of the resumption of the travel of the cable by means of a hook, pin, or other fixed catch with which the cord 54 may be engaged. Upon the detachment of the cord from the catch the closing-spring will seat the release-valve, and by the ensuing reinstatement of pressure in the main air-pipe the driving-belt will be shifted from the loose to the fast pulley and the cable and cars thereon again put in motion.

The cars which are employed for the transportation of mineral and other material over the main railroad-track 5 as well as over other tracks laid in and about the plant, accord in their general features of construction with ore or mine cars of the latest type now in service, and are, further, provided with novel accessories whereby they are adapted to the practice of my invention. Referring to Figs. 11 to 14, inclusive, and Figs. 21 and 22, it will be seen that the bodies 17 of the cars which are open at their tops to receive a load are supported on wheels 55, each of which is preferably fixed on an independent axle 56, rotating in an oil-box 57 to facilitate the easy passage of the cars around curves. The car-body 17 is downwardly inclined toward one side of the track to enable the load to be quickly dumped or discharged by gravity and is provided with a lateral discharge-opening, controlled by a discharge-door 58, which is hinged to the upper portion of the car-body, so as to have the capacity of being swung outwardly therefrom by pins 59. The door is held closed by locking-bolts 60, fitted to slide vertically in guides 61, secured to the door and engaging sockets 62. The locking-bolts 60 are withdrawn from their sockets to permit a load to be discharged and returned to said sockets to prepare the car for the reception of another load by a tripping-lever 63, which is pivoted by a pin 64 to the door and is coupled by a link 65 to a horizontal bar 66, the ends of which are secured to the locking-bolts 60. When the door is closed and locked, as shown in Figs. 11 and 12, the upper end of the tripping-lever projects outwardly for a sufficient distance to permit it to be struck and swung upon its pivot by a tripper 113, located adjacent to the track, as hereinafter described, its movement releasing the locking-bolts 60 from the sockets 62 and allowing the door to be pushed open by the load to discharge. When the door is open, the tripping-lever stands in a substantially vertical position, so as to pass a tripper or trippers without being brought into contact therewith. After the discharge of a load the door is closed and locked by an operator, when and only when he is ready to reload. When the door is allowed to remain open, it hangs vertically and retains the tripping-lever of the empty car in a vertical position, thereby enabling the empty car to pass all the tripping-rollers without coming in contact with them.

As previously mentioned, the propelling-cable 12 runs between the members of a pair of horizontal jaws 15, which are fixed to a vertical standard 16, secured to one end of the car-body 17, and open and outwardly curved at their ends farther from the standard 16 to admit of the ingress and egress of the propelling-cable for the attachment and detachment of the car to and from the same. When detached from the cable, the car may be pulled or pushed along a track by manual or other power applied to one or another of two horizontal rods or bars 67.

Where a car is intended for use in transporting loads of different materials—as, for example, ore and rock—at different times, it is preferably provided with a signaling device for indicating to a switchman or other operator the character of the load in order that the car may be transferred to a side track leading to the point of discharge desired for one kind of material or be kept on the main track for the delivery of another. To this end a double-armed signal-lever 68, provided with a central operating arm or handle 69, may be pivoted upon one end of the car-body. The signals or semaphores 70 71, which may be either of different colors or of different forms or be appropriately marked, respectively, to indicate the character of the load, are fixed upon the ends of the signal-lever 68, either of said signals being concealed, according to the adjustment of the lever which is made by the operator who loads the car, by a screen-plate 72, fixed to the end of the car-body, between which and the car-body either arm of the signal-lever may be swung and permitted to remain until replaced by the other, as may be required to indicate the character of the load.

The specific construction of dumping-car above described is not claimed as of my present invention, and the same forms the subject-matter of a separate application filed by me October 30, 1901, Serial No. 80,506.

The branch railroad-lines 6 of the several drifts or lateral passages 2 are single track, and the cars are operated thereon by hand, and each drift is in charge of a miner, who is assisted by one or two laborers or "muckers." The main track 5 is slightly elevated in advance of each receiving-switch 7, and the track of the receiving-switch is thereafter depressed in the same manner as the curved portions of the main track, as previously described. When a miner requires an empty car, he goes to the tunnel end of his drift, opens the receiving-switch 7, and catches the first empty car which is approaching on the then-connected main track. As this car leaves the main track and runs by gravity into the drift on the downward incline of the receiving-switch it automatically closes the receiving-switch to the main track and locks it in closed position, the operation of the mechanism provided being such that it is impossible to switch a car off the main track without instantly and automatically closing and locking the receiving-switch as the car leaves the main track, so as to prevent a succeeding car or cars from entering the drift-track.

My invention is not limited to any specific means for closing and locking the receiving-switch in and by the entering traverse of the car, and one form of mechanism which is suitably adapted to this end is exemplified herein and shown in Fig. 15 and Figs. 18 to 20, inclusive.

In the instance illustrated the movable rails of the receiving-switch 7 are connected by a bar 73, which is coupled by a link 74 to a pin 75 on a sheave or grooved pulley 76, which is fixed upon the lower end of a vertical switch-operating shaft 77. The shaft 77 is journaled in bearings in a switch-stand 78 and carries a hand-wheel 79 on its upper end. A locking-recess 80, which is adapted to engage the lower end of the shaft 77, is formed on one side of the coupling-link 74. A chain or other flexible connection 81 is connected to and wound on the sheave 76 and thence passes over a guide-sheave 82, journaled between the rails of the receiving-switch 7, and is connected to an arm 83 on a horizontal shaft 84, journaled adjacent to the guide-sheave 82. An arm 85, having a weighted striking-block 86 fixed to its outer end, is secured to the shaft 84, and said shaft is, when the switch is opened by the operator, brought to and held in such position in its bearings that the arm 85 shall stand vertically by means of a spring 87 bearing on a follower 88, which is coupled by a rod 89 and chain or other flexible connection 90 to the arm 83 of the shaft 84.

The receiving-switch 7 is normally closed to the drift 6 and is located in closed position by the engagement of the locking-notch 80 with the lower end of the shaft 77, with the arm 85 of the shaft 84 then lying in a substantially horizontal position and being subject to the tension of the spring 87. When the operator opens the receiving-switch 7 to the drift-track 6, which he does by rotation of the hand-wheel 79 and shaft 77, such rotation rocks the connected shaft 84 in its bearings and moves the arm 85 thereof into vertical position, in which it stands in front of the car which is entering the drift-track and is held in such position by the spring 87 until the car strikes the block 86 when, and resultant upon the contact of the car, the arm 85 is pushed down into normal horizontal position, and the shaft 77 is rotated through the connected sheave 76 and chain 81, such rotation moving the switch-rails to close the switch to the main track and effecting the engagement of the notch 80 and shaft 77, thereby locking the switch.

It will be obvious that mechanism of other specific construction may, if desired, be employed to effect the automatic closing and locking of the switch in and by the passage of a car from the main to the drift track without departure from the spirit of my invention. Thus, for example, a pneumatic cylinder and piston, which is known in the art as a "switch-operating" mechanism, may have its piston-rod connected with the movable switch-rails and be controlled by a valve actuated by the contact of a car with a movable block, as in the instance above described.

The turn-tables 9 of the drift-tracks may be of any suitable and preferred construction and, as shown in Figs. 15 to 17, inclusive, are in the form of cast-metal plates, suitably grooved to admit of the passage of the flanges of the cars, and supported on fixed base-plates 91 through the intermediation of ball-bearings 92.

The miner after receiving an empty car from the main track 5 pushes it by hand up to the heading in his drift, this being at a comparatively short distance from the main tunnel. He then loads the car and turns up the appropriate signal or semaphore 70 or 71, which indicates that the car is loaded with ore or with rock, accordingly as the case may be. The car is then pushed back to the turn-table 9, turned end for end and pushed out, or rather permitted to run out by gravity over the delivery-switch 8 to the main track. When it reaches the main track, the jaws 15 automatically pick up the propelling-cable 12, and the first pushing-ball 14 which strikes the jaws 15 carries the car, with the cable, to the exterior of the tunnel.

An operator who is stationed on the system near the portal of the tunnel observes the cars as they pass out therefrom, and if a car shows a signal indicating that it is loaded with rock he opens a switch 93, and this car alone runs out on a rock-dump siding 94, where the door is opened by hand and the load dumped, after which the door is allowed to remain open. The empty car is then run onto the main track and passes the ore-bins in the crusher-house 95, as its tripping-lever stands substantially in a vertical position when the door is opened and is not, therefore, acted upon by one of the trippers hereinafter described. After passing the crusher-house the car continues its traverse on the main track and is carried back into the tunnel by the propelling-cable.

If the dump-switch operator observes that the signal of an approaching car is that which indicates it to be loaded with ore, he allows it to pass his switch, and it runs on until it reaches the crusher-house 95, when its tripping-lever is struck by the tripping-roller located above the hopper of the ore-bin into which it is desired that the load shall be discharged, and the door of the car is thereby opened and the load dumped into said bin upon grizzlies which strain out all the fines and deliver the larger pieces by gravity into the large gyratory crushers. After the discharge of its load of ore the car continues its traverse and returns to the tunnel to be reloaded.

A switch-track 11 connects with the main track 5, near the outer terminal thereof, and leads to a sawmill, where all mine-timbers are finished to size before being brought into the tunnel. Another switch-track 10 extends to a warehouse where mine supplies, machinery, &c., may be loaded on cars and sent up to any of the several drifts of the tunnel as desired. The cars are moved on these branch tracks by manual or animal power.

The general arrangement of the stamp-mill which forms part of the plant is shown in the diagrammatic plan views, Figs. 9 and 10.

Each wing of the stamp-mill 96 is shown as provided with a double-track railroad 5ª, over which cars are transported by means of an endless propelling-cable 12ª, as in the case of the tunnel-railroad hereinbefore described. A row of ore-bins 97 for the reception of the crushed ore supplied from the crushers in the crusher-house 95 is located in proximity to the track 5ª. In the instance shown the ore-bins are fifteen in number in each half or wing of the stamp-mill, and each is intended to supply ten stamps, there being one hundred and fifty stamps in each wing. It is intended that a single operator shall attend to all the work in distributing the crushed ore to the bins which supply one hundred and fifty stamps, or, in other words, the bins of one-half of the stamp-mill, and it is therefore desirable, if not absolutely essential, that his operations shall be facilitated by mechanical appliances as far as possible. To this end the storage-bins 98, which receive the crushed ores from the gyratory crushers, are provided with discharge-gates 99, which are fitted to slide vertically in guides 100 and are connected to the piston-rods 101 of cylinders 102, to which compressed air is supplied through pipes 103, controlled by valves or cocks 104, which are manually actuated by cords or pendants 105. By this mechanical operation of the ore-discharge gate a car may be almost instantly loaded with a ton of crushed ore. Each storage-bin 98 is also provided with a pusher-cylinder 106, which is supplied with compressed air through a pipe 107, controlled by a four-way cock 108, which is actuated by the operator by means of a handle or a treadle in the usual manner. The cylinder 106 is fitted with a suitable piston, the piston-rod 109 of which carries a pivoted pushing-plate 110, adapted to abut against a bearing 111, fixed to the side of a car-body 17. When a car has been loaded, it is pushed away from the discharge-gate 99 and onto the main track, by which it is conveyed to the ore-bins 97 by the traverse of the piston resultant upon the admission of air to the left-hand end of the pusher-cylinder 106, after which the piston is returned to normal position by the admission of air to its opposite end in readiness to act upon the bearing 111 of the next car which is loaded.

In order to insure the delivery of each carload of crushed ore into any desired and determined bin 97, means are provided whereby the operator having selected the bin which he desires to supply adjusts a tripper connected with said bin in such position that it strikes the tripping-lever 63 of the door of a car as the car passes it, and thereby discharges the load of the car into said bin.

Figs. 31 to 37, inclusive, illustrate a mechanism for selecting and adjusting the positions of any one of a plurality of car-door-opening mechanisms, the apparatus being adapted to operate the trippers of a set of fifteen bins. A vertical post or standard 112 is fixed adjacent to the receiving-spring of each of the bins 97 of the stamp-mill, and a tripper 113, which is preferably, as shown, in the form of a cylindrical block, is fixed upon a bar 114, which is fitted to slide vertically in guides 115 on the standard 112. A spring 116 is connected to the lower end of the tripper-bar and to a hook on the standard, said spring acting to bring the tripper into the position shown in dotted lines in Figs. 33 and 34, when the draft on the upper end of the tripper-bar effected by its hand actuating mechanism is released, as hereinafter explained. The upper end of the tripper is connected by a cord or chain 117 to the lower arm of a bell-crank lever 118, which is journaled on the standard 112. The upper arm of the lever 118 is connected by a cord or chain 119 with the upper arm of one of a set of bell-crank levers 120, which are journaled upon a shaft 121, fixed above a frame 122, located in such position as to be conveniently accessible to the operator whose duty it is to supply the bins with ore.

A plurality of adjusting-shafts 123, corresponding in number with the trippers 113, (or with the addition of one or more spare ones for use in case of breakage or derangement,) is journaled in bearings on the frame 122, each shaft being provided with an operating-arm 124 and with an index 125 for indicating its position. Numbers corresponding with those of the several bins are marked upon the front of the frame 122, each adjacent to the shaft 123, by which the tripper of the correspondingly-numbered bin is adjusted. Each of the operating-arms 124 is coupled by a cord or wire 126 to the lower arm of one of the bell-cranks 120, being that one which is connected with the bell-crank 118 of the correspondingly-numbered bin. The operating-arms are held in downwardly-turned position, as shown, by their engagement with notches or recesses 127 in the frame 122, into which they are sprung laterally, the arms being reduced in thickness, as shown in Fig. 37, to enable them to be readily engaged with and disengaged from the notches 127. When in this position, all the trippers 113 will be raised to their higher position, as shown in full lines, and when standing in this position will permit a car to pass them without any one of them contacting with its tripping-lever and will not therefore open the door of the car.

Each of the trippers 113 may be and in practice preferably is connected with a signal or semaphore bearing the number of the bin adjacent to which the tripper is located, so that the position of the signal will indicate to the operator whether the tripper of the bin to which it refers is in position to strike or to clear the tripping-lever of a car, as the case may be.

The operator is located at a point from which he can reach any one of the operating-arms 124 and can observe all of the bins. When the ore in any one of the bins—as, say, bin No. 15—has receded below the top of the bin, so that he can no longer see it from where he stands, he releases the corresponding operating-arm 124 of the tripper of bin No. 15, which, as before stated, is indicated by the same number on the front of the frame 122, and the the spring 116 of said tripper thereupon draws it into and holds it in its lower or tripping position, as shown in dotted lines in Figs. 33 and 34, and the signal or semaphore will show that the proper tripper has been adjusted. He then starts his cars, and as each of them passes the tripper of bin No. 15 said tripper will strike the tripping-lever 63 of the car, and thereby open its door, and the car-load of crushed ore will be discharged by gravity into the bin. When bin No. 15 has been filled, which will be known to the operator by observing the ore showing above its top, he pulls down the operating-arm 124 of bin No. 15 and engages it with its notch 127, thereby raising the tripper of said bin out of tripping position. The corresponding operations are performed for other bins of the set as they are observed by the operator to require a supply of ore. If the operator should fail to release any of the operating-arms from the normal downward position in which they are locked on the frame 122, the loaded cars will pass all of the bins without being emptied and will return loaded to the point at which the operator stands.

It will be seen that while my invention is primarily and specially designed for application in connection with plants for the mining of ores and the extraction of metals therefrom it is not in any wise limited to such specific application, and its features of novelty and utility may, either collectively or severally, be made available in the transportation and delivery of other materials and under conditions of operation which differ from those obtaining in the instance herein exemplified, and in which the advantages of comparatively low structural and operative cost and reduction of labor involved in operation will correspondingly facilitate and economize the operations in which such novel and useful features are employed.

It is further to be observed that various modifications of structural detail may be made in the application of my invention without departure from its essential features and principle of operation, and the substitution of mechanical equivalents for specific devices herein illustrated which may in certain cases readily suggest themselves to those skilled in the art to which my invention relates may be made without varying the combined structural relation of separate members and operative principle of the complete apparatus which are herein set forth.

I claim as my invention and desire to secure by Letters Patent—

1. The combination of a railroad-track having straight portions or tangents connected by an intermediate curve, and which is upwardly inclined adjacent to the curve and thereafter downwardly inclined, in order to enable the traverse of cars around the curve to be effected by gravity, a propelling-cable extending in line with the straight portions of the track, in position to impart movement to a car thereon, and means, as a guide-roller, by which the cable is led clear of the curve and its direction changed from the line of one tangent to that of the other.

2. The combination of a double-line railroad-track having the terminals of its lines connected so as to enable the lines to be traversed throughout by cars, in opposite directions, respectively, said track having straight portions or tangents connected by intermediate curves and being upwardly inclined, in the direction of the traverse of cars adjacent to each curve, and thereafter downwardly inclined, in order to enable the traverse of the cars around the curves to be effected by gravity, a propelling-cable extending in line with the straight portions of each track, in position to impart movement to a car thereon, and guide-rollers, each located in position to lead the cable clear of a curve and to change its direction from the line of one tangent to that of the next succeeding one.

3. The combination of a main railroad-track, a propelling-cable extending along said track, in position to impart movement to a car thereon, a branch railroad-track extending laterally from the main track, a switch connecting the branch track with the main track, means for manually opening said switch, and means, operable by the traverse of a car on said switch, for closing and locking it.

4. The combination of a main railroad-track which is upwardly inclined adjacent to its connection with a branch track, a propelling-cable extending along said track, in position to impart movement to a car thereon, a pushing member which is connected with said cable and which may be automatically engaged with, and disengaged from a car, a branch railroad-track extending laterally from the main track, and which is downwardly inclined adjacent to its junction with the main track, a switch connecting the branch track with the main track, means for manually opening said switch, and means, operable by the traverse of a car on said switch, for closing and locking it.

5. The combination of a main double-line railroad-track, having one, at least, of the terminals of its lines connected by a loop, so as to enable the lines to be traversed throughout by cars, in opposite directions, respectively, a propelling-cable extending along each track, in position to impart movement to a car thereon, a pushing member which is connected with said cable and which may be automatically engaged with, and disengaged from, a car, a plurality of branch railroad-tracks, each extending laterally from the main track, receiving and delivery switches, each connecting one of the branch tracks with the main track, means for manually opening each receiving-switch, and means, operable by the traverse of a car on each receiving-switch, for closing and locking said switch.

6. The combination of a main double-line railroad-track, having one, at least, of the terminals of its lines connected by a loop, so as to enable the lines to be traversed throughout by cars, in opposite directions, respectively, a propelling-cable extending along each track, in position to impart movement to a car thereon, a pushing member which is connected with said cable and which may be automatically engaged with, and disengaged from, a car, a plurality of branch railroad-tracks, each extending laterally from the main track, turn-tables each located in the line of one of the branch tracks, receiving and delivery switches, each connecting one of the branch tracks with the main track, means for manually opening each receiving-switch, and means, operable by the traverse of a car on each receiving-switch, for closing and locking said switch.

7. The combination of a railroad-track, a propelling-cable extending along said track, in position to impart movement to a car thereon, driving mechanism for effecting the traverse of the cable, and an automatic fluid-pressure mechanism connected with a member of the driving mechanism and adapted to arrest the movement of the cable by causing the cessation of the application of motive power thereto.

8. The combination of a railroad-track, a propelling-cable extending along said track, in position to impart movement to a car thereon, driving mechanism for effecting the traverse of the cable, a fluid-pressure mechanism connected with a member of the driving mechanism and adapted to arrest the movement of the cable by causing the cessation of the application of driving power thereto, and means for actuating said fluid-pressure mechanism from any one of a plurality of points on the line of track.

9. The combination of a railroad-track, a propelling-cable extending along said track, in position to impart movement to a car thereon, driving mechanism for effecting the traverse of the cable, a belt-shifter by which a driving-belt may be transferred from a fast to a loose pulley, and vice versa, in the driving mechanism, and an automatic fluid-pressure mechanism connected with and adapted to impart movement to the belt-shifter.

10. The combination of a railroad-track, a propelling-cable extending along said track, in position to impart movement to a car thereon, driving mechanism for effecting the traverse of the cable, a main air-pipe extending along the line of track and connected with a source of air under pressure, a manually-operable release-valve controlling an opening in said pipe, an auxiliary air-reservoir, a belt-shifter cylinder fitted with a piston and rod, a triple valve connected with the main air-pipe, auxiliary reservoir, and belt-shifter cylinder, a belt-shifter by which a driving-belt may be transferred from a fast to a loose pulley, and vice versa, in the cable-driving mechanism, and a connection coupling the belt-shifter with the piston-rod of the belt-shifter cylinder.

11. The combination of a railroad-track, a propelling-cable extending along said track in position to impart movement to a car thereon, driving mechanism for effecting the traverse of the cable, a pressure-lever coupled to a fixed support, a pressure-roller journaled on said lever and bearing against a belt of the driving mechanism, a toggle-lever system coupled to the pressure-lever, a weight suspended from the toggle-lever system, and an adjusting-shaft connected to the toggle-lever system for varying the degree of bearing of the pressure-roller upon the belt.

12. The combination of a railroad-track, a propelling-cable extending along said track, in position to impart movement to a car thereon, a pushing member connected with the cable, a car fitted to traverse on the track, a bearing fixed to said car which is automatically engageable with, and disengageable from, the pushing member of the cable, by lateral movements of the car, and a signal adjustably connected to the car for indicating to a switch operator whether or not automatic disengagement is to be permitted, as may be required by the character of the load of the car.

13. The combination of a railroad-track, an adjustable tripper located at a desired point of delivery adjacent thereto, and means for moving said tripper into and out of position to contact with a tripping or door-opening mechanism on a car traversing the track.

14. The combination of a railroad-track, a plurality of adjustable trippers, each located at a desired point of delivery adjacent thereto, a plurality of operating-shafts, mounted in a common supporting-frame, and connections, each coupling one of said operating-shafts with one of the trippers, whereby any desired and selected tripper may be moved into position to contact with a tripping or door-opening mechanism on a car traversing the track.

15. The combination of a railroad-track, a plurality of adjustable trippers, each located at a desired point of delivery adjacent thereto, a plurality of operating-shafts, mounted in a common supporting-frame, connections, each coupling one of said operating-shafts with one of the trippers, locking devices for holding the operating-shafts in such position that the trippers will stand clear of a tripping or door-opening mechanism on a car traversing the track, and means connected with the trippers, whereby any one of them will be moved into position to contact with a car-door tripping or opening mechanism when the locking device of its connected operating-shaft is released.

16. The combination of a railroad-track, a plurality of adjustable trippers, each located at a desired point of delivery adjacent thereto, signals or indicators, each connected to and movable with one of the trippers, a plurality of operating-shafts, mounted in a common supporting-frame, and connections, each coupling one of said operating-shafts with one of the trippers, whereby any desired and selected tripper may be moved into position to contact with a tripping or door-opening mechanism on a car traversing the track, and its movement indicated to the operator.

17. The combination of a railroad-track, a car fitted to traverse thereon, a storage-bin located adjacent to the track, a discharge-gate controlling an opening in the bin in position to deliver material therefrom into a car on the track, and a fluid-pressure device for opening and closing the discharge-gate.

18. The combination of a railroad-track, a car fitted to traverse thereon, a storage-bin located adjacent to the track, a discharge-gate controlling an opening in the bin in position to deliver material therefrom into a car on the track, a fluid-pressure cylinder having its piston-rod connected with the discharge-gate, and a valve controlling the admission and exhaust of fluid to and from said cylinder.

RALPH BAGGALEY.

Witnesses:
GEO. H. NOYES,
WM. M. KIRKPATRICK.